United States Patent

Wordin et al.

(10) Patent No.: US 6,651,957 B2
(45) Date of Patent: Nov. 25, 2003

(54) TRACTRIX VALVE

(76) Inventors: John J. Wordin, 735 N. 900 East, Shelley, ID (US) 83274; Eugene Chisely, 3626 Brentwood Dr., Fort Smith, AR (US) 72903

(*) Notice: Subject to any disclaimer, the term of this patent is extended or adjusted under 35 U.S.C. 154(b) by 0 days.

(21) Appl. No.: 09/801,969

(22) Filed: Mar. 5, 2001

(65) Prior Publication Data

US 2002/0121621 A1 Sep. 5, 2002

(51) Int. Cl.[7] ............................................. F16K 5/00
(52) U.S. Cl. ................................... 251/312; 251/309
(58) Field of Search ......................... 251/309, 310, 251/311, 312

(56) References Cited

U.S. PATENT DOCUMENTS

| 1,451,588 A | * | 4/1923 | Reidt .......................... 251/312 |
| 3,279,492 A | * | 10/1966 | Bell et al. .................... 251/309 |
| 3,735,957 A | * | 5/1973 | Duggar, Jr. .................. 251/312 |
| 4,510,966 A | * | 4/1985 | Parsons, Jr. .................. 251/312 |
| 4,878,652 A | | 11/1989 | Wordin |
| 5,044,606 A | | 9/1991 | Wordin |
| 5,234,194 A | * | 8/1993 | Smith .......................... 251/309 |
| 5,326,074 A | * | 7/1994 | Spock, Jr. et al. .......... 251/312 |
| 5,402,983 A | * | 4/1995 | Bernhardt .................... 251/309 |
| 5,779,222 A | * | 7/1998 | Hollingworth et al. ...... 251/309 |

OTHER PUBLICATIONS

Reddick, Miller "Advanced Mathematics for Engineers" John Wiley & Sons, NY 1956 pp102, 103.
Marks "Standard Handbook for Engineers" T. Brumeister, Editor 8th Edition McGraw Hill New York 1979 p. 2–41.

* cited by examiner

Primary Examiner—Henry C. Yuen
Assistant Examiner—John Bastianelli

(57) ABSTRACT

A new, unique combination of the tractrix valve and the tractrix stem seal is described as an improvement over the original patents issued. The plug and the stem seal are juxtaposed large end to large end. The stem seal functions as a fluid seal and as a journal bearing. The purpose of the tractrix valve is to prevent leaks through the seat of the valve and to the outside environment past the stem seal by use of long-term self-renewing tractrix surfaces that continue to mate after continued use.

5 Claims, 2 Drawing Sheets

TRACTRIX VALVE

CROSS-REFERENCE TO RELATED APPLICATIONS

U.S. Pat. No. 4,878,652 Plug Valve
U.S. Pat. No. 5,044,606 Valve Stem and Packing Assembly
H. W. Reddik and F. H. Miller "Advanced Mathematics For Engineers" John Wiley and Sons 1955 pp. 102–103.
"Marks Standard Handbook For Engineers" T. Brumeister, Editor 8$^{th}$ Edition McGraw-Hill Book Co. 1979 p. 2–41

BACKGROUND OF THE INVENTION

1. Field of the Invention

This invention relates to the field of valves, namely plug valves.

2. Background Information

Plug valves are quarter-turn valves with a rotating element that is shaped like a truncated cone. In 1989, a patent was issued, U.S. Pat. No. 4,878,652, Plug Valve, in which the sides of the truncated cone are modified by shaping it in the form of a tractrix curve from top to bottom. The purpose of the curved surface in the form of a tractrix is to impart even and uniform wear between the mating surfaces of the plug and body. As a result, leaks through the seat of the plug valve are eliminated, since the plug continues to wear in against the body, and continues to mate perfectly. Numerous tests with valve models, and subsequently, several valve prototypes have shown this to be a fact.

In 1991, a second patent was issued, U.S. Pat. No. 5,044,606, that used the tractrix technology to create a stem seal for any quarter-turn valve, such as a plug valve, ball valve, or a butterfly valve. Prototype valve design has incorporated the tractrix stem seal into the tractrix valve. This new and unique combination of the tractrix valve with the tractrix stem seal has resulted in simplifications and cost reductions for producing the valve.

The theory of even wear using the tractrix curve is described elsewhere and is a known art. The basis of the plug design is a tractrix body of revolution, known as a pseudo sphere.

Small plug angles are utilized to create large sealing pressure with a small axial force. This occurs due to the nature of the axial pressure, $P_a$, that is a result of the axial force, $F_a$, illustrated in FIG. 1. The axial pressure is defined as the axial force, $F_a$, divided by the projected area, A, of the tractrix plug. The axial pressure is a constant over the entire surface of the tractrix body of revolution. The axial pressure depends on two variables, the axial force and the slope angle of the tractrix curve. FIG. 2 shows that a large force produces a large axial pressure, while a small axial force produces a small axial pressure. The effect of slope angle is shown in FIG. 3, where, for the same axial force, the normal pressure, $P_N$, is much larger for the smaller slope angles of the tractrix curve. In equation form:

$$P_N = P_a / \sin \theta$$

As can be readily seen, a small angle can produce a large normal pressure that can be utilized for sealing against internal fluid pressures. As a result of this feature of the tractrix curve, smaller plug angles have been used in the design of prototype tractrix plug valves. Slope angles for tractrix plugs have spanned the range from 4 degrees to 15 degrees with one tractrix plug using an angle of 27 degrees. Practical considerations have resulted in a preferred tractrix plug angle of about 8 degrees.

BRIEF SUMMARY OF THE INVENTION

The Tractrix Valve comprising a body, plug with integral stem, stem seal, and bonnet is described. The small end of the tractrix plug fits down inside the body of the valve. This places the large end of the plug near the middle of the valve. Lubrication grooves are located in the plug in order to add lubricant to the plug/body interface. The lubrication reduces friction between the plug and the body in order to keep the torque low. There is an integral stem rigidly attached to the plug. Since the plug and stem must turn on the same axis, it is important that the plug and stem be concentric. A lower portion of the stem is flared in the form of a tractrix shape to accommodate a stem seal with an identical mating tractrix surface forming a stem/stem seal interface. The direction of the tractrix flare on the stem is opposite from the direction of the tractrix flare of the tractrix plug. Usually, the stem seal is made of an elastomeric material, such as TEFLON or polypropylene, selected for low friction as one of its properties. Low friction is important in order to keep the torque required to open and close the valve within a reasonable value. A bonnet is attached to the tractrix valve body by means of a plurality of bolts. The bonnet serves to hold the plug, stem, and stem seal in place. Springs are employed to hold the plug against the body and simultaneously force the stem seal against the stem. A retainer ring transmits the spring force to the stem seal. The stem and stem seal combination doubles in function as a journal bearing. The journal bearing function allows the stem seal to remain fixed while permitting the plug with integral stem to turn to allow the valve to open and close against the axial spring force imposed on the stem seal. The springs are commonly disc springs, also called Belleville washers, but the axial force function could also be generated by other means. The function of the axial force generated by the springs is to hold the plug against the body thereby creating a primary seal against the internal fluid pressure in the valve. The same spring force pushes the stem seal against the stem thereby creating a secondary seal on the stem. It's necessary for the stem seal to remain stationary so a tight static seal can be maintained between the interface of the stem seal and the valve bonnet.

DETAILED DESCRIPTION OF THE INVENTION

Description of the Preferred Embodiment

Figure 1:
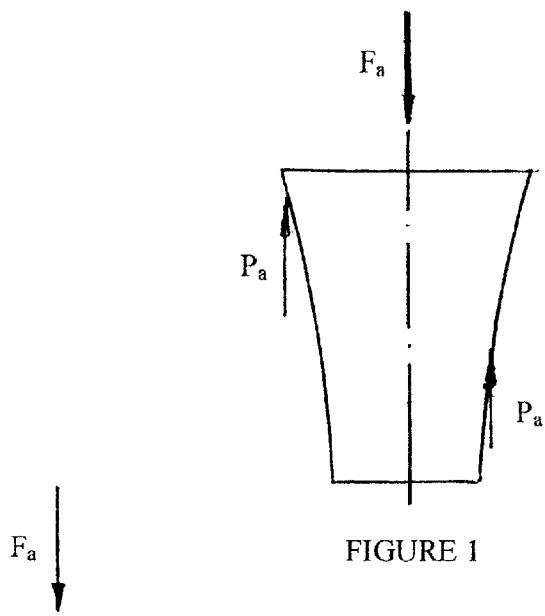
FIG. 1 shows a general tractrix plug with axial force and uniform pressure acting over the entire surface.
Figure 2:
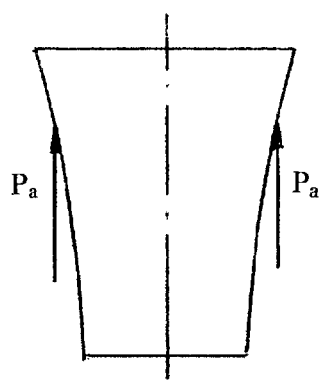
FIG. 2 shows a comparison between a large axial force and a small axial force and the resulting axial pressure.
Figure 2:
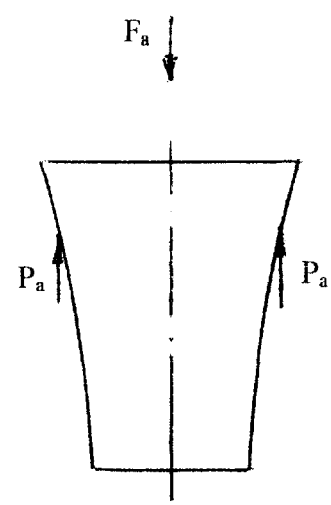
Figure 3:
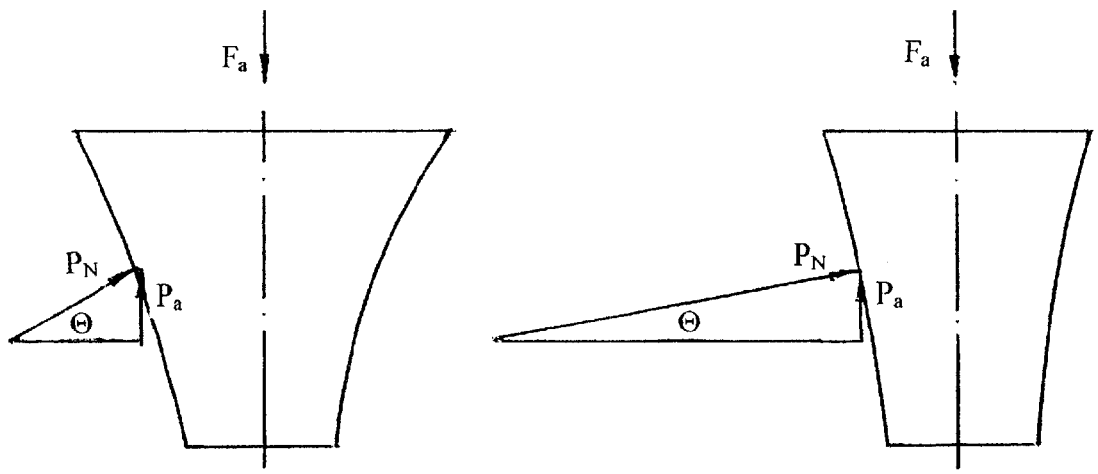
FIG. 3 shows a comparison between a large angle tractrix valve plug and a small angle tractrix valve plug.
Figure 4:
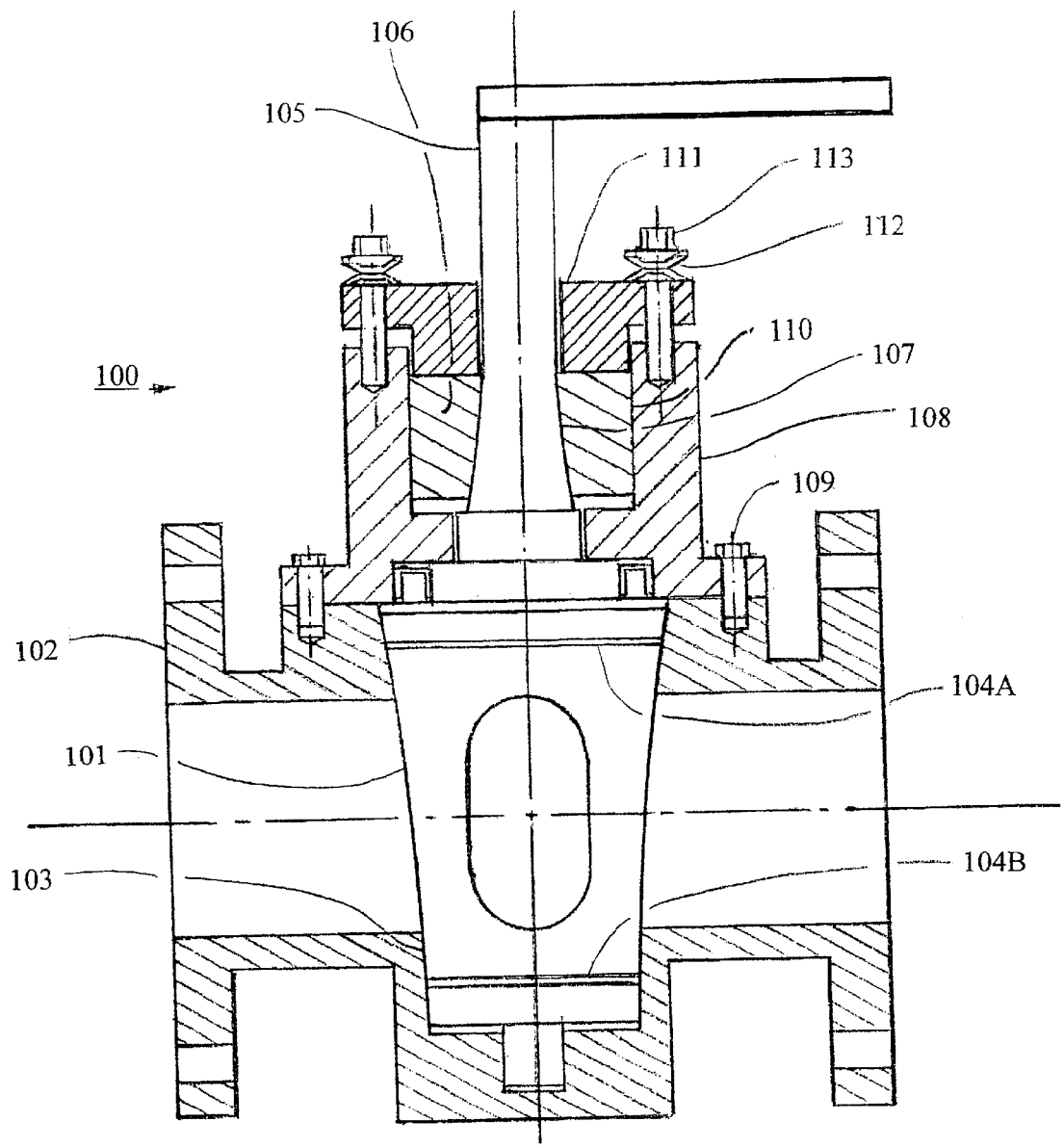
FIG. 4 shows the preferred embodiment of the combination of the tractrix valve plug and the tractrix stem seal.

A tractrix plug valve, 100, of FIG. 4 is composed of a tractrix valve plug, 101, inserted into a matching tractrix valve body, 102. This basic combination was described in U.S. Pat. No. 4,878,652, accepted as prior art. Tractrix valve plug, 101, and a matching tractrix valve body, 102, form a tractrix plug/body interface, 103. Lubrication grooves, 104A and 104B, are located in the plug, 101, in order to add lubricant to a plug/body interface, 103. An integral part of the tractrix valve plug, 101, is a valve stem, 105, which is rigidly attached to and concentric with the plug, 101. The lower part of the stem, 105, is flared in the form of a tractrix to accommodate a stem seal, 106. The direction of the tractrix flare on the stem, 103, is opposite from the direction of the tractrix flare of the tractrix plug, 101. Stem, 105 and stem seal, 106, form a mating tractrix stem/stem seal interface, 107. The valve stem, 105, and the stem seal, 106, together forming a tractrix stem/stem seal interface, 107, also functions as a journal bearing. A bonnet, 108, is attached to the tractrix valve body, 102, by means of a plurality of bolts, 109. The bonnet, 108, serves to hold the plug, 101, stem, 105, and stem seal, 106 in place. A stem seal/bonnet interface, 110, exists between the stem seal, 106, and the bonnet, 108, and is cylindrical in form. A retainer ring, 111, has the function of transmitting axial force on the system of plug, 101, and stem seal, 106, to create the sealing pressures required to contain fluid in the valve. An axial force function is supplied by a set of springs, 112, located under a plurality of bolts, 113, which attach the retainer ring, 111, to the bonnet, 108.

What is claimed is:

1. A tractrix valve comprising:

a tractrix valve plug with a tractrix flare, a valve stem with a tractrix flare, said valve stem being rigidly attached and concentric with said tractrix valve plug and where the tractrix flare of said valve stem is in the opposite direction to said tractrix valve plug;

a tractrix valve body with a tractrix shape matching said tractrix valve plug inserting said tractrix valve plug into said tractrix valve body to form a tractrix plug/body interface;

a bonnet, a plurality of bolts, attaching said bonnet to said tractrix valve body with said plurality of bolts;

a stem seal with an internal tractrix shape and an external cylindrical shape inserting said stem seal onto said valve stem to form a mating tractrix stem/stem seal interface and a mating stem seal/bonnet interface;

a retainer ring, a plurality of bolts with springs located under the bolts, attaching said retainer ring to said bonnet by means of said plurality of bolts with springs located under said plurality of bolts for the purpose of imposing an axial force to said retainer ring, said tractrix stem/stem seal interface, and said tractrix plug/body interface to create sealing pressures required to contain fluid in said tractrix plug valve.

2. The tractrix plug valve of claim 1 wherein said valve stem/stem seal interface functioning continuously as a journal bearing permitting said tractrix plug valve to open and close.

3. The tractrix plug valve of claim 1, wherein said tractrix valve plug, said tractrix stem seal, and said set of springs generating a common axial force for said tractrix plug and said tractrix stem seal for the purpose of simultaneously generating sealing pressures on the surfaces of said tractrix plug/body interface and said valve stem/stem seal interface.

4. The tractrix plug valve of claim 1 having said tractrix valve plug wherein the angle of said tractrix valve plug is 7.96 degrees for the purpose of generating high sealing pressures.

5. The tractrix valve of claim 1 having said tractrix plug/body interface wherein said tractrix valve plug having lubrication grooves for the purpose of filling said tractrix plug/body interface with lubricant.

* * * * *